United States Patent

[11] 3,603,266

| [72] | Inventor | Henry Fort Flowers<br>Findlay, Ohio 45840 |
|---|---|---|
| [21] | Appl. No. | 810,192 |
| [22] | Filed | Mar. 25, 1969 |
| [45] | Patented | Sept. 7, 1971 |

[54] TILTING DUMP CAR DOOR HINGE
6 Claims, 6 Drawing Figs.

[52] U.S. Cl. .................................................. 105/276,
298/18, 308/22
[51] Int. Cl. .................................................. B60p 1/26,
B11d 9/02, F16c 35/10
[50] Field of Search ........................................ 105/272,
276, 277; 298/18; 308/22

[56] References Cited
UNITED STATES PATENTS

| 2,618,507 | 11/1952 | Peller | 105/272 X |
| 2,826,999 | 3/1958 | Flowers | 105/277 |
| 3,120,822 | 2/1964 | Flowers | 105/276 X |
| 3,166,022 | 1/1965 | Flowers | 105/276 X |
| 3,457,878 | 7/1969 | Flowers | 105/276 |

*Primary Examiner*—Arthur L. La Point
*Assistant Examiner*—Howard Beltran
*Attorney*—Diller, Brown, Ramik & Holt

ABSTRACT: This disclosure relates to an improvement in a tilting railway dump vehicle, and in particular for a down-turning side door thereof. The side door is hinged at points reinforced by a hollow boxlike structure. The reinforcing box is defined by a portion of the side door, a pair of sidewalls and an outer wall rigidly secured to each other. A reinforcing web is disposed inside of the box and extends between and is rigidly secured to each of the sidewalls thereof. The side door is pivotally connected to the body of the dump vehicle by hinge boss means comprising a pair of hinge bosses associated with each reinforcing box whereby each boss is rigidly attached to both the web and one of the sidewalls thereof.

INVENTOR
HENRY FORT FLOWERS
BY Diller, Brown, Ramik + Hall
ATTORNEYS

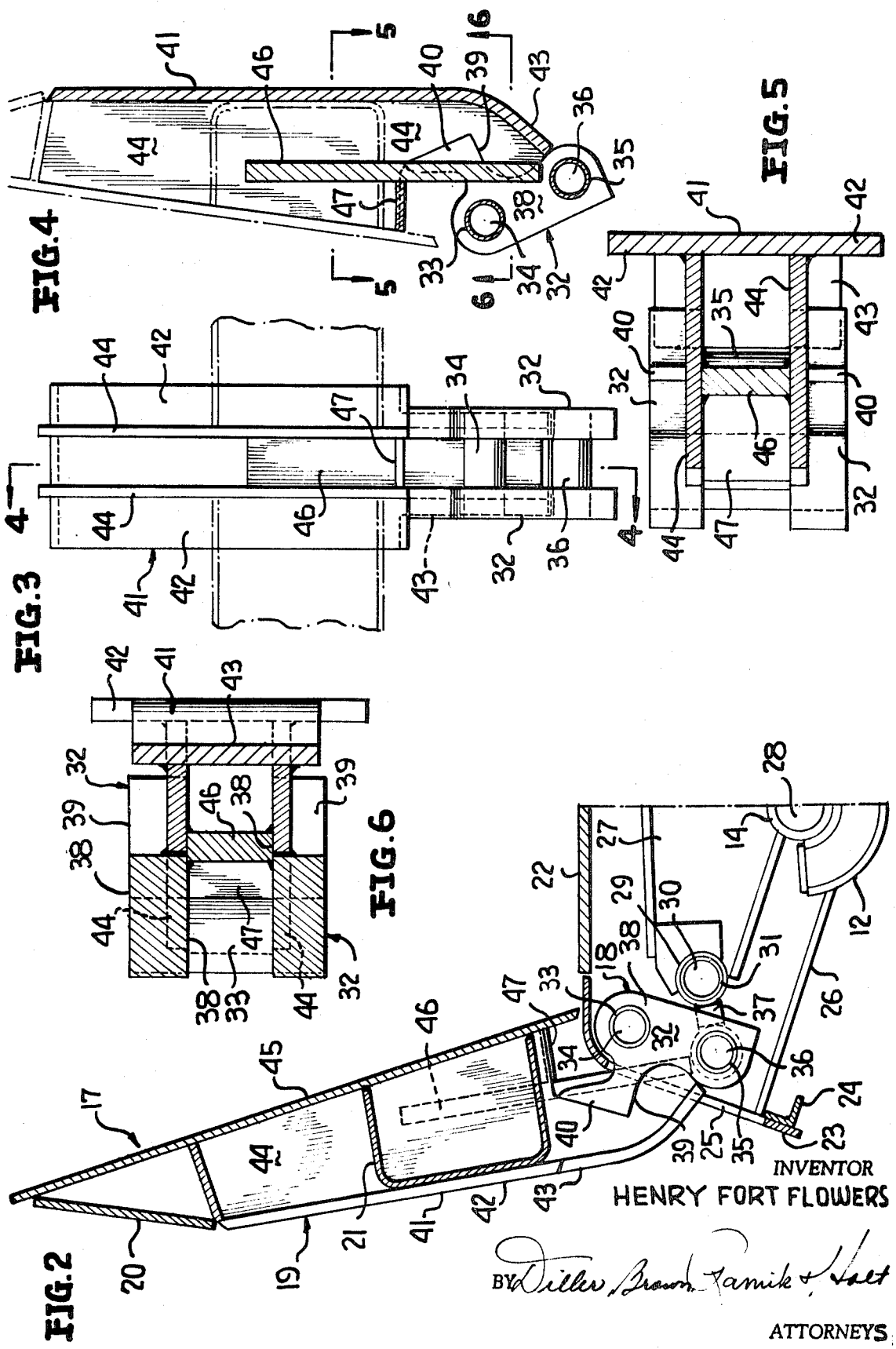

3,603,266

TILTING DUMP CAR DOOR HINGE

This invention relates to dump vehicles, and more particularly to dump vehicles having a down-turning side door that may be pivoted relative to the vehicle body to discharge the contents therefrom.

Still more particularly, this invention relates to an improvement in the side door construction, whereby a hollow boxlike structure is provided at the hinge points thereof for reinforcing the side door.

Dump vehicles of the type to which this invention is directed may be for either railway track or roadway use and are generally constructed of welded sheet metal plates and forms. The use of such lightweight sheets in the fabrication of dump vehicles is recognized as being most advantageous both in point of construction and also economy. However, such lightweight construction produces problems relating to the maintenance of adequate structural rigidity, particularly in the down-turning side doors which must be capable of withstanding high stress loads imposed by the lading carried by the vehicle during the discharge operation.

It has been found that the relatively lightweight of the down-turning side door can be compensated for by providing relatively heavy reinforcing box structures along the door at the hinge portions thereof. It is an object of this invention to provide an improved reinforcing box structure for a dump vehicle side door of the type described.

More particularly, it is an object of this invention to provide an improved construction for a reinforcing box of a down-turning side door in a tilting dump vehicle, the reinforcing box being defined by a portion of the side door, a pair of side walls and an outer wall rigidly secured to each other, a reinforcing web disposed inside the box and extending between and rigidly secured to each of the sidewalls thereof, hinge boss means attached to both the sidewalls and to the web, and means for pivoting the hinge boss means to move the side door between relatively upright and down-turned positions thereof.

With the above and other objects in view that will hereinafter appear, the nature of the invention will be more clearly understood by reference to the following detailed description, the appended claimed subject matter and the several views illustrated in the accompanying drawings.

IN THE DRAWINGS

FIG. 2 is a partial sectional view taken along line 2—2 of FIG. 1, and illustrates a down-turning side door reinforced by a hollow box structure formed in accordance with this invention.

FIG. 3 is a fragmentary inside elevational view of a box structure formed in accordance with this invention, and illustrates the sidewalls and reinforcing web thereof and a pair of associated hinge bosses being rigidly attached to each of the sidewalls and the web.

FIG. 4 is a fragmentary vertical sectional view taken along line 4—4 of FIG. 3, and further illustrates details of one of the hinge bosses and a sidewall and web of a reinforcing box to which it is attached.

FIG. 5 is a sectional view taken along line 5—5 of FIG. 4, and illustrates the H-shaped configuration defined by the sidewalls and web of a reinforcing box in cross section.

FIG. 6 is a sectional view taken along line 6—6 of FIG. 4 and illustrates still further details of the reinforcing box and associated hinge bosses formed in accordance with this invention.

Figure 1:
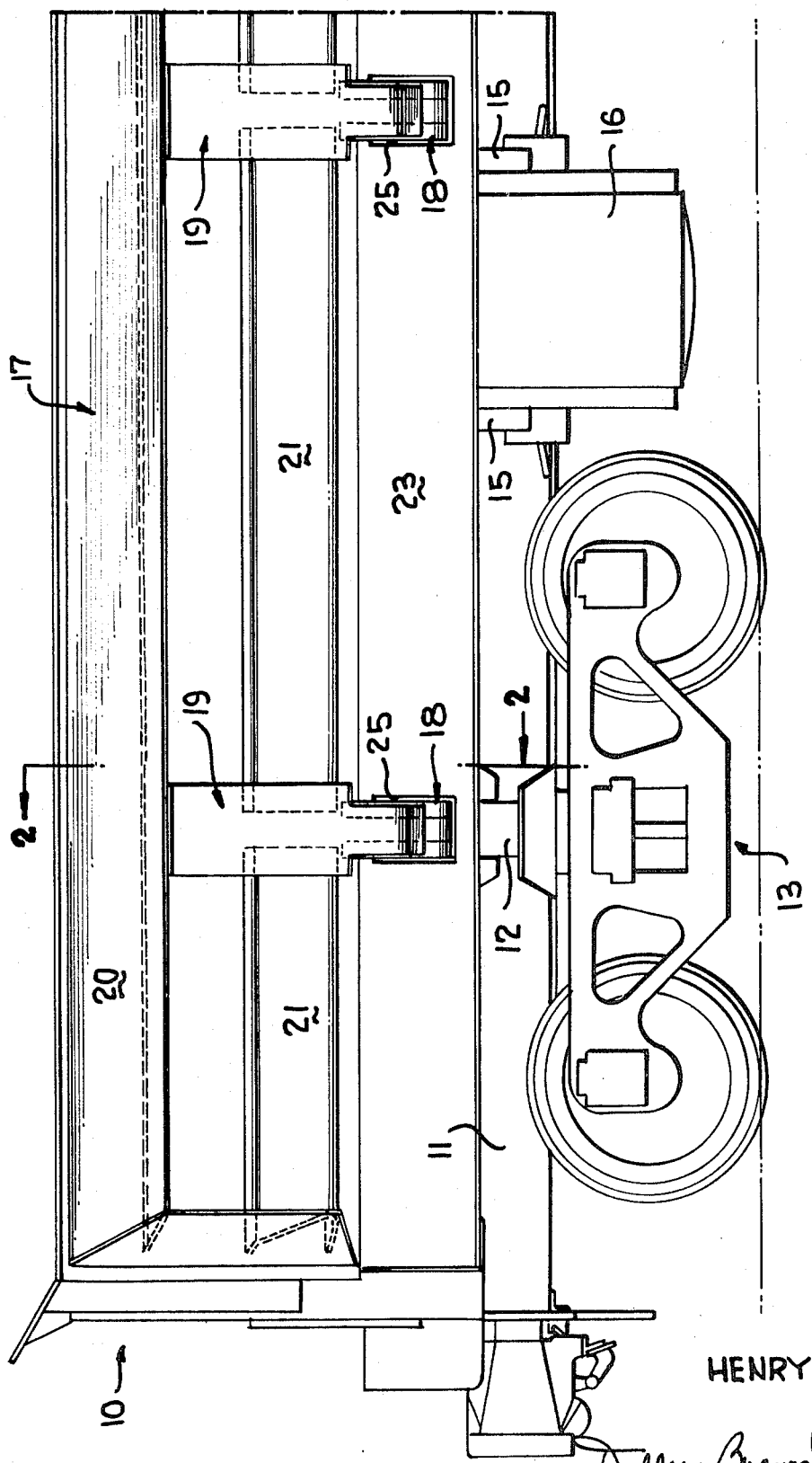
FIG. 1 is a partial side view of a railway dump vehicle having a hinged down-turning side door construction of this invention.

Referring now to the drawings in detail, there is illustrated in FIG. 1 a railway dump vehicle generally referred to by the numeral 10. The dump vehicle 10 has an underframe with a central box beam or sill 11. The underframe 11 has a transversely extending bolster 12 disposed above each wheel assembly 13. Each bolster 12 supports a trunnion bearing 14 (FIG. 2). The underframe 11 also has a pair of journal bearings 15, 15 for an airlift cylinder 16. Two such cylinders 16 are mounted on each side of the underframe 11 for tilting the vehicle body in one or the opposite lateral direction.

The dump vehicle 10 further includes a side door construction 17 pivotally mounted relative to the body of the dump vehicle 10 by means of hinge assemblies 18 disposed at longitudinally spaced positions thereof which render the side door 17 capable of down-turning for discharge purposes, and controlled in its outward or lading discharge position, so that the door 17 forms a continuation of the plane of the tilted body of the vehicle 10.

In order to compensate for the use of lightweight steel or other metallic construction for the door proper, the side door 17 is reinforced by box structures 19 disposed opposite and above each of the hinge assemblies 18. The box structures 19 increase the rigidity of the side door 17 and allow for the use of relatively heavy hinge assemblies 18, which further increase the rigidity of the door structure 17, by providing mounting means therefor of increased structural strength. The reinforcing boxes 19 are attached to the side door 17 boxes being welded or otherwise suitably fastened to braces 20 and 21 which form part of the side door 17 and extend longitudinally thereof to increase its structural rigidity.

The load carrying portion of the dump vehicle 10 includes a floor plate or bottom 22 (FIG. 2) which is turned down at the sides thereof to form a flaring skirt or side plate 23, as seen in FIGS. 1 and 2. The outer longitudinal edge of the skirt 23 is reinforced by an angle bar brace 24, as seen in FIG. 2. Apertures 25 are provided in the skirt 23 at the points where the hinge assemblies 18 are positioned so that portions thereof can extend therethrough and up into the box structures 19 in a manner and for a purpose to be hereinafter described. Suitable means (not shown) are provided on either side of the apertures 25 on which the hinge assemblies 18 may be pivotally mounted.

A skirt aperture reinforcing bottom plate 26 is provided and slopes inwardly beneath the aperture 25 and is attached to the angle bar brace 24 to further reinforce the supporting structure for the hinge assemblies 18. A door control device or operating arm 27 extends from the trunnion bearing 14 and is adapted to actuate the hinge assembly 18. The trunnion bearing 14 receives a pin 28 which is journaled in suitable support means (not shown) depending from the bottom plate 22. The axis of the pin 28 is the one about which the vehicle body 10 is tilted for discharge.

Aligned bearing sleeves 29 are mounted on the end of each operating arm 27 as seen in FIG. 2. A pin 30 is provided with end journals 31, 31 which are fitted within the sleeves 29, 29.

Each hinge assembly 18 includes a pair of spaced parallel hinge bosses 32 carried by a bearing sleeve 33 which is pivotally mounted on a pin 34 journaled in suitable means (not shown) depending from the bottom plate 22. Each of the hinge bosses 32 further includes independent sleeves 35 which are aligned and form journals for a common pin 36. The operating arm 27 is operatively connected to the hinge assembly 18 through a link 37 which extends from the pin 30 to the pin 36. Door interlocking and operating apparatus including operating arm means and linkage of the nature of the arm 27 and linkage 37 is disclosed in Flowers U.S. Pat. No. 2,826,999 issued Mar. 18, 1958.

Each hinge boss 32 includes two flat sides 38 and an irregularly shaped edge 39 defining the periphery thereof. As seen most clearly in FIG. 2, each hinge boss 32 further includes an upper arm portion 40 which extends through the aperture 25 in the skirt 23 and up into the interior of the reinforcing box 19 and is attached thereto in a manner to be hereinafter described.

Each reinforcing box 19 includes an outer wall 41 having laterally extending wing portions 32 and a downwardly extending and inwardly curved central portion 43 which extends in through the aperture 25 and is attached, by suitable means such as welding, to the hinge assembly 18. The box 19 further includes two sidewalls 44 which extend between the outer wall 41 and a portion 45 of the side door 17 and are rigidly attached thereto. A reinforcing web 46 is disposed within the box 19 and extends between and is rigidly attached to each of the sidewalls 44. Another reinforcing web or plate 47 extends between and is rigidly attached to the web 46 and the wall portion 45 of the side door 17. The webs or plates 46 and 47 serve to further increase the structural rigidity of the reinforcing box 19. The webs or plates 46 and 47 also serve to seal the reinforcing box 19 against the entrance of mud or fine material when the body of the vehicle 10 is tilted and the door 17 is in its lading discharge position.

As seen most clearly in FIG. 2, the sidewalls 44 extend between the outer wall 41 and the inner wall portion 45 from the upper brace 20 down to a lower portion which terminates in an edge which conforms in part to the peripheral shape of the arm 40 of the boss 32 and in part to its irregularly shaped edge 39. Thus, the hinge bosses 32 are suitable attached as by welding to the lower edge portions of the sidewalls 44 along the conforming portions of their irregularly shaped peripheral edges 39 and the edges of the arms 40. The hinge bosses 32 are further connected to the reinforcing boxes 19 by being attached as by welding along their side faces 38 to the web 46. It is thus apparent that the hinge assemblies 18 will be rigidly and securely attached to the reinforcing boxes 19 thereby ensuring a reliable pivotal connection to the side door 17 while increasing its structural rigidity.

It should be noted that the lateral extensions or wings 42 of the outer wall 41 are wider than the aperture 25 and thus present abutment shoulders thereof which, when the side door 17 is turned down to its open position, will come to rest on the skirt 23 laterally of the aperture 25 and opposite the skirt aperture reinforcing bottom plate 26. They therefore limit the down-turning movement so that the door proper extends in the plane of the tilted vehicle bottom 22 so as to provide a continuation thereof. Moreover, the wings 42 provide an extra width to the outer wall 41 whereby a much more efficient connection of the reinforcing box 19 can be effected with the longitudinally extending braces 20 and 21 of the door 17 than would be possible with a narrower hinge construction.

From the foregoing, it should be readily apparent that there is provided in accordance with this invention a structure that has definite advantages in permitting the use of lighter weight sheet metal for the down-turned door. This is possible because of the reinforcing box mounting which terminates at its lower end in suitable hinge members. These hinge members are mounted in pairs and are of heavier than usual plate construction. The mounting of the door is therefore adequately reinforced both in its vertical position and when lowered for discharge.

Although a preferred embodiment of the invention has been specifically illustrated and described herein, it is to be understood that minor variations may be made without departing from the spirit of the invention.

I claim:

1. In a tilting dump vehicle having a down-turning side door, a bottom and a depending bottom skirt with spaced apertures; at least one hollow reinforcing box defined by an inside wall portion of said side door, a pair of laterally projecting sidewalls and an outer wall rigidly secured to each other, a reinforcing web inside said box extending between and rigidly secured to each of said sidewalls, laterally spaced hinge boss means rigidly secured to said sidewalls and to said web, and means for pivoting said hinge boss means to move said side door between relatively upright and down-turned positions thereof.

2. The dump vehicle as defined in claim 1 wherein a reinforcing box is positioned opposite and above each of said apertures.

3. The dump vehicle as defined in claim 2 wherein said outer wall of each reinforcing box has a upper portion wider than the apertures of said skirt to present abutment shoulders for movement limiting contact with the skirt laterally of the associate aperture therein.

4. The dump vehicle as defined in claim 1 wherein said hinge boss means are defined by a pair of hinge bosses, each of said bosses comprises two flat sides and an irregularly shaped edge defining the periphery thereof, and said bosses are attached to said web along portions of their flat sides and are attached to said sidewalls along portions of their irregularly shaped edges.

5. The dump vehicle as defined in claim 1 wherein said sidewalls and said web define an H-shaped configuration in cross section.

6. The dump vehicle as defined in claim 1 including a plate extending between and rigidly secured to said inside wall portion of said side door and said web.